(12) United States Patent
Milward et al.

(10) Patent No.: US 10,706,218 B2
(45) Date of Patent: Jul. 7, 2020

(54) EXTRACTING INFORMATION FROM TABLES EMBEDDED WITHIN DOCUMENTS

(71) Applicant: Linguamatics Ltd., Cambridge (GB)

(72) Inventors: David Richard Milward, Cambridge (GB); Himanshu Agrawal, Redmond, WA (US); James Robert Walton Cormack, Hampton (GB); Francisco Nuno Quintiliano Mendonca Carapeto Costa, Cambridge (GB)

(73) Assignee: Linguamatics Ltd., Cambridge (GB)

(*) Notice: Subject to any disclaimer, the term of this patent is extended or adjusted under 35 U.S.C. 154(b) by 169 days.

(21) Appl. No.: 15/594,762

(22) Filed: May 15, 2017

(65) Prior Publication Data

US 2017/0329749 A1    Nov. 16, 2017

Related U.S. Application Data

(60) Provisional application No. 62/337,216, filed on May 16, 2016.

(51) Int. Cl.
| | |
|---|---|
| G06F 16/00 | (2019.01) |
| G06F 40/14 | (2020.01) |
| G06F 16/84 | (2019.01) |
| G06F 40/18 | (2020.01) |
| G06F 40/154 | (2020.01) |
| G06F 40/166 | (2020.01) |
| G06F 40/177 | (2020.01) |

(52) U.S. Cl.
CPC .............. *G06F 40/14* (2020.01); *G06F 16/86* (2019.01); *G06F 40/154* (2020.01); *G06F 40/166* (2020.01); *G06F 40/177* (2020.01); *G06F 40/18* (2020.01)

(58) Field of Classification Search
CPC ........................................................ G06F 16/86
USPC ............................................................ 707/741
See application file for complete search history.

(56) References Cited

U.S. PATENT DOCUMENTS

| | | | | |
|---|---|---|---|---|
| 5,848,186 | A  * | 12/1998 | Wang ................. | G06K 9/00463 382/176 |
| 2009/0144313 | A1* | 6/2009 | Hodge ................ | G06F 16/2264 |
| 2014/0369602 | A1* | 12/2014 | Meier .................. | G06K 9/6218 382/182 |
| 2016/0104077 | A1* | 4/2016 | Jackson, Jr. ........... | G06N 7/005 706/12 |

* cited by examiner

*Primary Examiner* — Chelcie L Daye
(74) *Attorney, Agent, or Firm* — John Maldjian; Maldjian Law Group LLC

(57) ABSTRACT

Much valuable information in documents is presented within tables. However, the information within tables is hard to extract automatically with high accuracy due to the wide variety and low quality of typical tables found in electronic documents. Information extraction technology can provide a method of extracting information from heterogeneous tables by recognizing tables, the header cells, and cells that are merged or should be merged, creating a richer representation of table structure and providing a convenient way of linking cells to their row and column headers. Use of this richer representation allows a few extraction patterns to successfully pull out information from a wide variety of differently formatted tables.

21 Claims, 16 Drawing Sheets

| Group | Measured Component | Experiment | | |
|---|---|---|---|---|
| | | A | B | C |
| I | Ferric chloride hexahydrate | 0.111 | 0.155 | 0.282 |
| II | Sodium carbonate | 0.132 | 0.213 | 0.273 |
| | Sodium gluconate | 0.239 | 0.344 | 0.587 |

*FIG. 2A*

| Group | Measured component | Experiment | | |
|---|---|---|---|---|
| | | A | B | C |
| I | Ferric chloride hexahydrate | 0.111 | 0.155 | 0.282 |
| II | Sodium carbonate | 0.132 | 0.213 | 0.273 |
| | Sodium gluconate | 0.239 | 0.344 | 0.587 |

*FIG. 2B*

TABLE 28

Aptamer Plasma Stability half-life

| ARC # | T½ Human plasma (hrs) | T½ Rat plasma (hrs) |
|---|---|---|
| ARC1172 (SEQ ID NO 222) | 17 | 3 |
| ARC1346 | not done | 19 |
| ARC1368 | 63 | 21 |
| ARC1533 | 93 | not done |

TABLE 28

Aptamer Plasma Stability half-life

| ARC # | T½ Human plasma (hrs) | T½ Rat plasma (hrs) |
|---|---|---|
| ARC1172 (SEQ ID NO 222) | 17 | 3 |
| ARC1346 | not done | 19 |
| ARC1368 | 63 | 21 |
| ARC1533 | 93 | not done |

*FIG. 5B*

TABLE 28

Aptamer Plasma Stability half-life

| ARC # | T½ Human plasma (hrs) | T½ Rat plasma (hrs) |
|---|---|---|
| ARC1172 (SEQ ID NO 222) | 17 | 3 |
| ARC1346 | not done | 19 |
| ARC1368 | 63 | 21 |
| ARC1533 | 93 | not done |

*FIG. 5C*

TABLE 28

| Table Id 49 | Stability half-life | | |
|---|---|---|---|
| | | T½ Human plasma (hrs) | |
| ARC # | | | |
| ARC1172 (SEQ ID NO 222) | | 17 | |
| ARC1346 | | not done | |
| ARC1368 | | 63 | |
| ARC1533 | | 93 | |

| Header Type | column |
|---|---|
| Row Id | 3 |
| Column Id | 4 |
| Row Ref | t49r3 |
| Column Ref | t49c4 |

| Header 1 | Header 2 | Value | Doc | | Hit | |
|---|---|---|---|---|---|---|
| T½ Human | ARC1172 | 17 | US-20060183702-A1 | 1 | T½ Human... ARC1172 (SEQ ID NO 222... | 17 |
| T½ Human | ARC1368 | 63 | US-20060183702-A1 | 1 | T½ Human... ARC1368 | 63 |
| T½ Human | ARC1533 | 93 | US-20060183702-A1 | 1 | T½ Human... ARC1533 | 93 |
| T½ Rat | ARC1172 | 3 | US-20060183702-A1 | 1 | T½ Rat... ARC1172 (SEQ ID NO 222... | 3 |
| T½ Rat | ARC1346 | 19 | US-20060183702-A1 | 1 | T½ Rat... ARC1346... | 19 |
| T½ Rat | ARC1368 | 21 | US-20060183702-A1 | 1 | T½ Rat... ARC1368... | 21 |

*FIG. 6*

TABLE 28

Aptamer Plasma Stability half-life

| ARC # | T½ Human plasma (hrs) | T½ Rat plasma (hrs) |
|---|---|---|
| ARC1172 SEQ ID NO 222 | 17 | 3 |
| ARC1346 | not done | 19 |
| ARC1368 | 63 | 21 |
| ARC1533 | 93 | not done |

*FIG. 7*

| Data Element | Entry | Instructions |
|---|---|---|
| Tumor type: | CM | Provide the tumor type of the case. |
| Specimen sent to: | NCH | Indicate to which location the case was originally sent. |
| Specimen received: | 06/04/2015 | Provide the date (MM/DD/YYYY) of shipment arrival. |

*FIG. 8A*

```
- <table>
  - <tr>
      <td>Data Element</td>
      <td>Entry</td>
      <td>Instructions</td>
    </tr>
  - <tr>
      <td>Tumor type:</td>
      <td>CM</td>
      <td>Provide the tumor type of the case.</td>
    </tr>
  - <tr>
      <td>Specimen sent to:</td>
      <td>NCH</td>
    - <td>
         Indicate to which location the case was originally sent.
      </td>
    </tr>
  - <tr>
      <td>Specimen received:</td>
      <td>06/04/2015</td>
      <td>Provide the date (MM/DD/YYYY) of shipment arrival.</td>
    </tr>
  </table>
```

EXTRACTING INFORMATION FROM TABLES EMBEDDED WITHIN DOCUMENTS

CROSS-REFERENCE TO RELATED APPLICATION(S)

This application claims priority to U.S. Patent Application No. U.S. 62/337,216, entitled "EXTRACTING INFORMATION FROM TABLES EMBEDDED WITHIN DOCUMENTS," filed May 16, 2016 which is incorporated by reference in its entirety.

BACKGROUND

Key information can be contained within tables that are themselves embedded in documents, whether full-text journal articles, patents, slides or health records. For example, important experimental results may be contained within a table in a PowerPoint presentation, or key lab values relevant to a patient may be contained within a table in an electronic health record. Information contained within tables is hard to extract automatically with high accuracy due to the wide variety and low quality of typical tables found in electronic documents.

One particular difficulty in extracting information contained within tables arises from the way in which table structures are typically represented in semi-structured formats like SGML, HTML, document or presentation formats such as Word or PowerPoint or various XML formats (e.g., XHTML, XML OASIS or CALS table models). Cells can span multiple rows or columns, and even for simple cells there is no association between the cell and its respective column and row headers.

Another difficulty arises from the fact that many tables found in electronic formats contain representation errors. These can arise from a variety of factors, including imperfect optical character recognition (OCR) and the breaking apart of cells to improve the readability of items within a table.

BRIEF DESCRIPTION OF THE DRAWINGS

FIGS. 2A and 2B show an example illustrating merging the cells of a table.

FIG. 5A-5D show an example of processing a table within a patent document.

FIG. 6 shows an example of information extracted from a processed table in FIG. 5C.

FIG. 7 shows highlighting within an example table rendered in HTML showing the evidence for the extraction provided in FIG. 6.

FIG. 8A presents an example of table represented in plain text.

FIG. 8B shows an example of the table of FIG. 8A converted to HTML format.

DETAILED DESCRIPTION

Figure 1A:
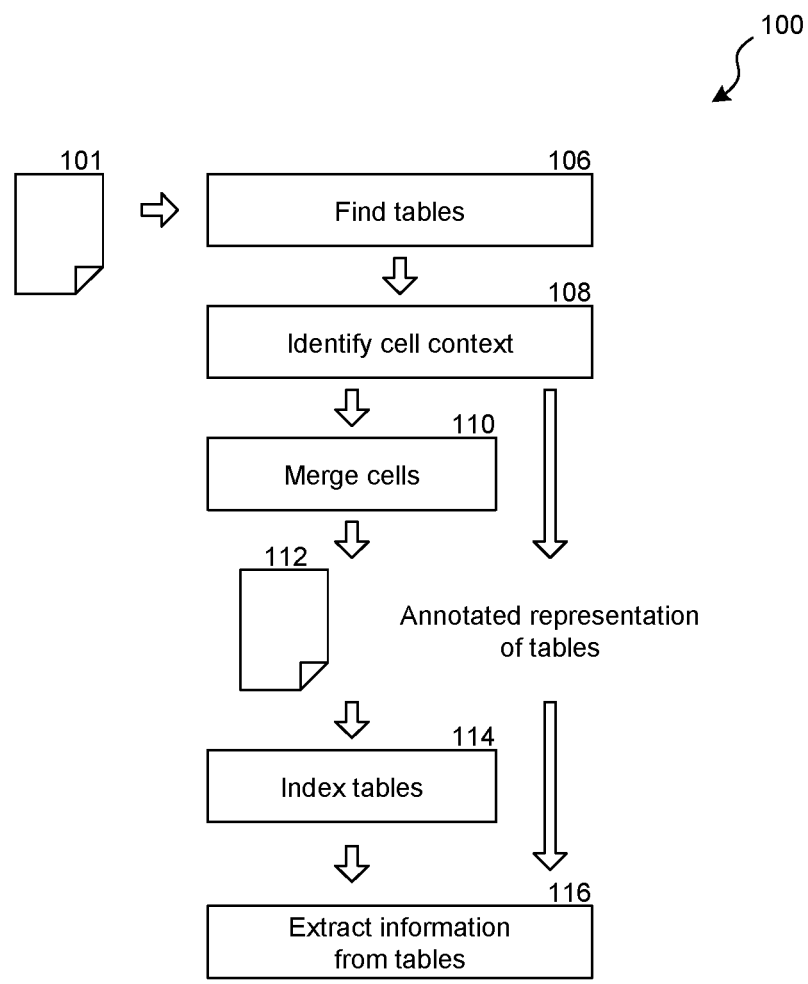
FIG. 1A is a flow diagram illustrating a process used in some implementations for extracting table information from semi-structured text.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure or characteristic described in connection with the embodiment is included in at least one embodiment of the disclosure. The various appearances of the phrase "in one embodiment" in the specification do not necessarily refer to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

The terms used in this specification generally have their ordinary meanings in the art, within the context of the disclosure, and in the specific context in which each term is used. Certain terms that are used to describe the disclosure are discussed below, or elsewhere in the specification, to provide additional guidance to the practitioner regarding the description of the disclosure. Certain terms may be highlighted, for example, by using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein; no special significance is to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for the convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in the broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description.

The information extraction technology disclosed herein can provide a method of extracting information from heterogeneous tables in either semi-structured or unstructured text by recognizing headers and merged cells. The information extraction technology can also create a richer representation of table structure to provide a linking of cells to their respective row and column headers.

Information extraction is concerned with extracting relationships from unstructured and semi-structured text. Unstructured text might contain a statement such as "profit in 2015 for Company A was 2 million dollars." A table might include a legend of "profits (million dollars)," a column header of "2015," a row header of "Company A" and a cell value of "2." Even when the table is annotated with XML or HTML elements, there can be several challenges to extracting the information, such as the following:

1) Many formats represent table cells as elements contained in table rows, and the table rows as elements contained in tables. The relationship between a cell and the table column it belongs to is not directly represented.
2) Cells, including header cells, may span multiple columns and rows.
3) Logical cells in tables are often split to aid visibility or during OCR.
4) Distinctions between value cells and header cells are often missing in text-based content sources.

As described in greater detail below, the information extraction technology can overcome these challenges by recognizing tables, header cells, and cells that are merged or should be merged, creating a richer representation of table structures and providing a convenient way of linking cells to their respective row and column headers. Use of this richer representation allows extraction patterns to successfully pull out information from a wide variety of differently formatted tables.

FIG. 1A is a flow diagram illustrating a process 100 used in some implementations for extracting table information from semi-structured text. Examples of semi-structured text include documents in formats such as HTML or XML. These formats may provide a structure for tables based on tables containing one or more rows, which themselves contain one or more cells, but they may not provide relationships between cells and their respective row and column headers or other defining cells. Moreover, although these formats may allow for differentiation between row- and column-defining or header cells and data cells, in practice, many tables found in semi-structured documents fail to correctly apply these identifiers.

At stage 106, process 100 can find one or more tables in a semi-structured portion of input document 101. Stage 106 can involve looking for a structured element such as "table," although other element names are also possible.

At stage 108, process 100 can identify cell contexts. Each cell can be classified as either a header cell or a data cell. Header cells can be recognized based on one or more of the following: explicit coding of header cells in the input; formatting differences between header cells and other cells; the presence of at least one header cell for every column; the presence of horizontal lines; the nature of the cell content (blank vs. numeric vs. textual; lowercase vs. uppercase text); the presence of measurement units within brackets; words referring to operations on the values in the table (e.g., "sum," "total," "average," "avg."). Header cells can be further classified as being a column header cell, a row header cell or both, based on their position in the table. Any cell not recognized as a header cell may be considered to be a data cell.

Each data cell can be linked to its respective column and row headers. A data cell can be linked to multiple column or row headers, for example, when the table has individual column headers for each column, and then other column headers spanning several columns. Header cells can also be linked to other header cells when there are multiple levels of headers. In some implementations, column and row headers can be encoded directly by annotating each data cell with the text of the column header cell(s) in its column and the text of the row header cell(s) in its row. In some implementations, the relation between a data cell and its respective row header(s) and column header(s) can be encoded indirectly. Each cell can be annotated with one or more identifiers for the rows that it spans and one or more identifiers for the columns that it spans.

Figure 1B:
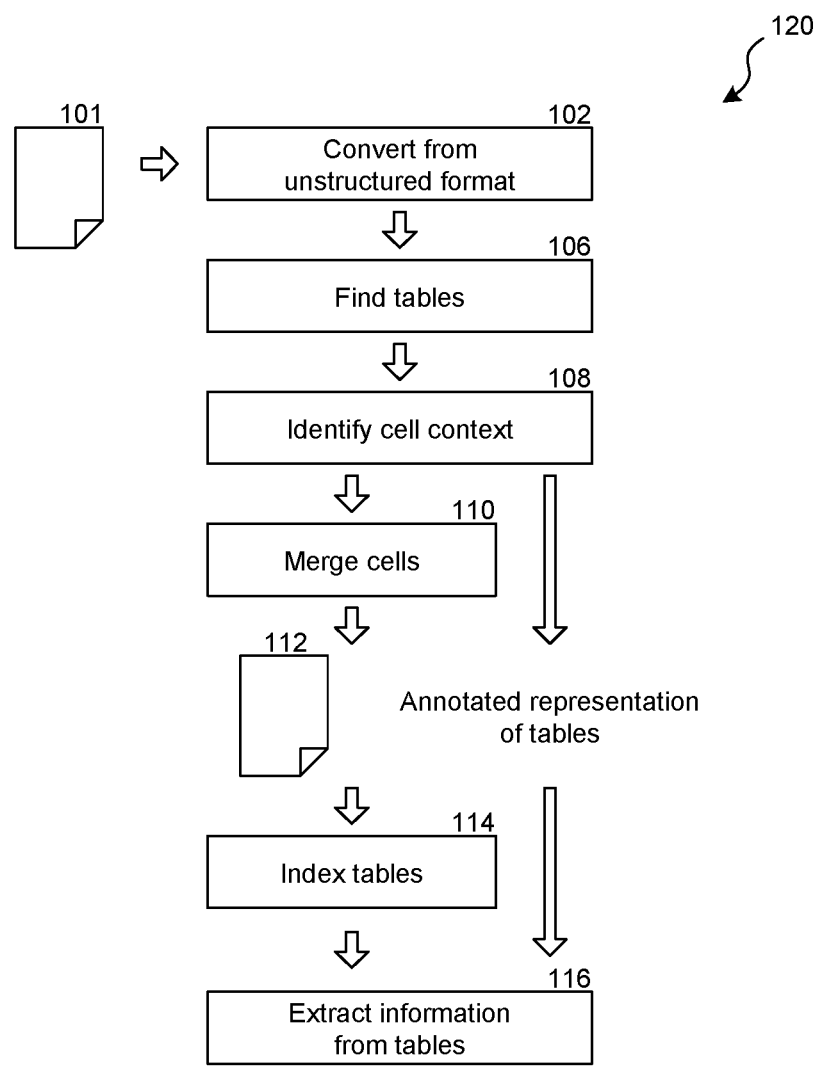
FIG. 1B is a flow diagram illustrating a process used in some implementations for extracting table information from unstructured text.
Figure 1C:
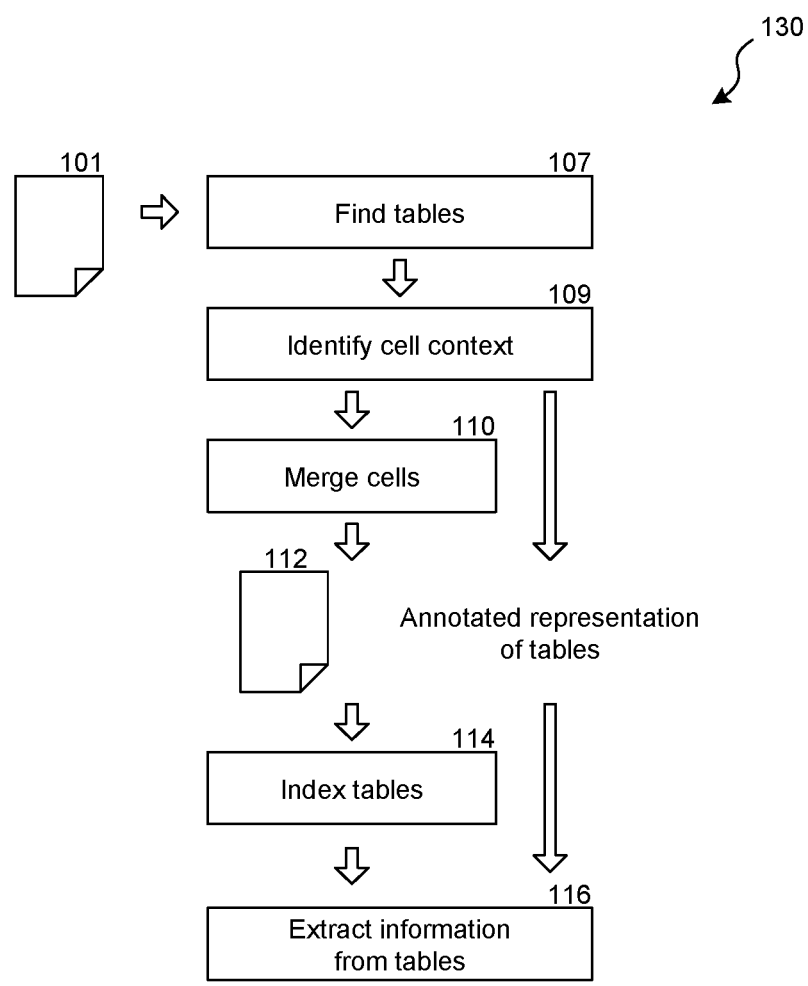
FIG. 1C is a flow diagram illustrating a process used in some implementations for extracting table information from unstructured text.
Figure 1D:
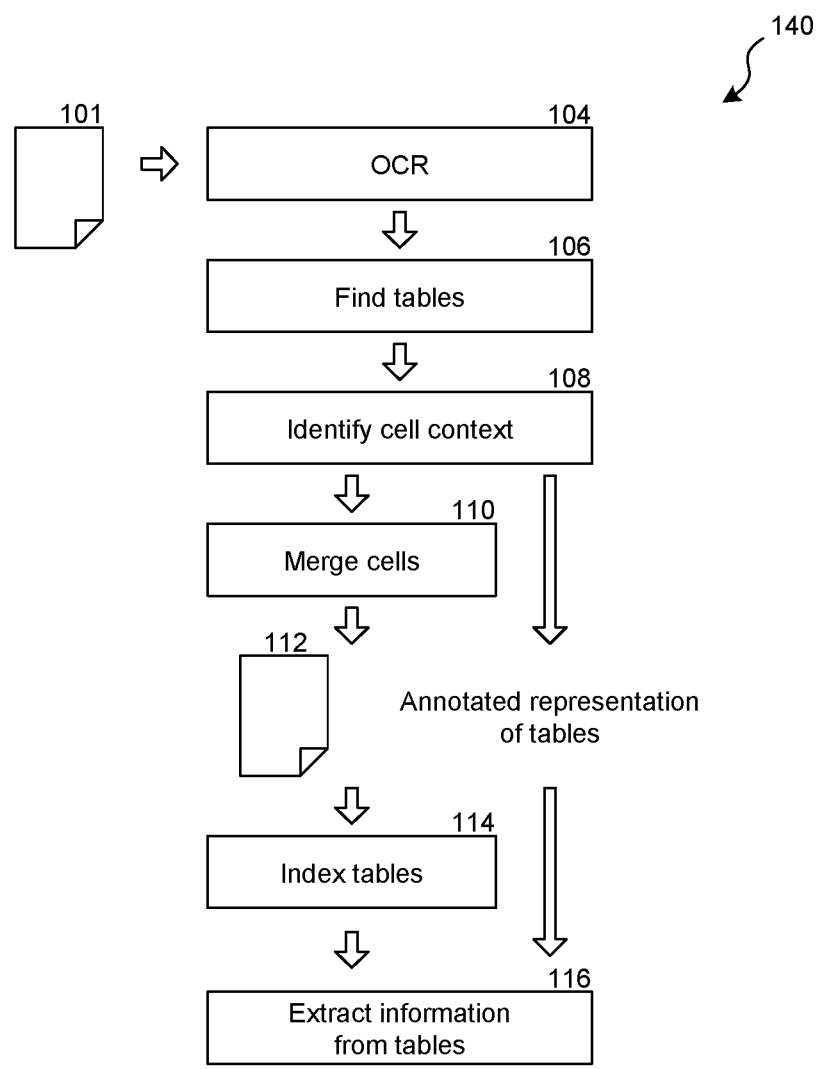
FIG. 1D is a flow diagram illustrating a process used in some implementations for extracting table information using OCR to create semi-structured text.
Figure 3:
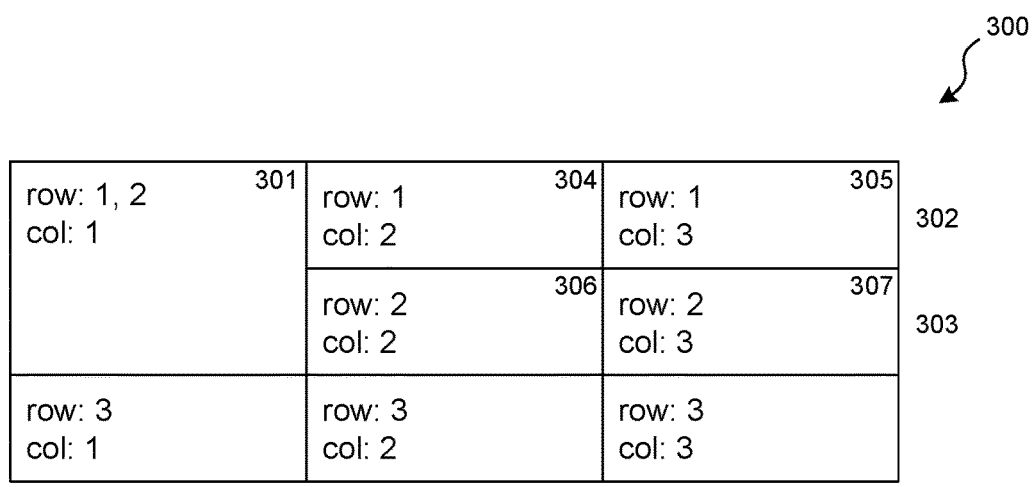
FIG. 3 shows an example illustrating an annotated table in which a cell spans multiple rows.

These annotations, represented in FIGS. 1A-1D as Annotated representation of tables 112, are generated by process 108 in FIGS. 1A, 1B and 1D and process 109 in FIG. 1C. The annotations can use any identifier, for instance, numeric identifiers (indexes) that reflect the position of that row or column within the table. For example, FIG. 3 provides an example of an annotated representation of table. These embodiments allow identification of any two cells in the same row or column, even if neither is a header cell. In some implementations, at least some of the column and row headers can be encoded directly and at least some can be encoded indirectly. FIG. 5D shows another possible implementation where these annotations are made available for inspection in tooltips (or other layers or portions of display) of tables and table cells. These tooltips pop up when a user hovers their mouse cursor over a table cell. FIG. 5D shows a tooltip 532 for one of the table cells, displaying the annotated identifiers for the row and column that the cell occupies, and also another tooltip 534 for the entire table, showing a unique identifier for the table.

Cells that span multiple rows or columns can be recognized according to the input format (e.g., XML CALS format, HTML, XHTML). In some implementations, cells that span multiple rows or columns may be expanded out. In some implementations, cells that span multiple rows or columns may have multiple headers, and headers that span multiple rows or columns are shared by multiple cells. In some implementations, cells including header cells that span multiple rows or columns may have multiple indexes corresponding to the individual rows and columns that they span.

At stage 110, process 100 can optionally merge two or more cells of a table. In some implementations, table structures may be corrected by merging cells and/or rows. Despite the structured format, often the initial structuring provided in a semi-structured document is appropriate for the reading of the text, but does not reflect the logical structure of the table. FIG. 2A shows an example table 200 in which the second row of column header text has been split into separate rows, 201 and 202. One of the chemical descriptions has also been split across multiple cells, 203 and 204. The first column of row headers contains empty cells, 205 and 206, which reflects that the cell above should span the row with the empty cell as well. FIG. 2B shows a table 250, which is the result of merging cells from table 200. There is now a single header cell, 251, with the text "Measured Component," rather than two cells, 207 and 208, where this text was separated. The column header with the text "Experiment," 252, is now correctly aligned with the last three columns of the table. The row header with the text "II," 253, is now correctly aligned with the last two rows. The chemical description, 254, is now in a single cell.

Process 100 can merge cells based on one or more of the following: empty cells; rows with similar structure (e.g., where the same number of cells span the same columns); the distinguishing of header cells and data cells; the amount of text within a cell suggesting wrapping into the next cell; mismatched brackets in the text that would match if cells are merged; cell contents starting or ending with a conjunction or a preposition; or any combination thereof. For table 200 in FIG. 2A, stage 110 in FIG. 1A can merge every cell in row 210 with the cell above it (row 209) due to these rows being rows of column headers and there being no empty cell in the bottom row (210), but many empty cells in the top row (209). Row 210 is merged into row 209 because column headers are typically vertically aligned to the bottom. In the case of rows 211 and 212, stage 110 can merge every cell in row 212 with the cell above it due to these rows not being rows of column headers and there being multiple empty cells in row 212. Row 212 can be merged into row 211 because the text in data cells tends to be vertically aligned to the top and the text in row 212 ("hexahydrate") being lowercase suggests that it is not the start of a cell. In the case of the last cells of the first row (labeled 213, 214 and 215), stage 110 can prefer to merge them horizontally rather than vertically because this is the first row of column headers. Tables often contain main column headers spanning multiple columns, with sub-headers below.

At stage 114, process 100 can optionally index the document into a format optimized for large-scale querying search and text mining. For example, an index can be created that allows fast searching of tabular information contained within millions of individual documents. Process 100 can manipulate the representation, which includes the annotations for the table cells, and these can be converted to different formats and optimized for different needs, where the annotations for the table cells are nevertheless preserved. One example of this is converting the representation into a format optimized for efficient search. In some embodiments, the annotation process is automatic and results in annotations represented in a digital format that is amenable to further automatic manipulation, namely of the kind needed to facilitate computer-based search. The identifiers for the rows and columns of a table enable a search engine to find cells that occupy the same row or column by comparing these identifiers.

At stage 116, process 100 can extract information from the table. In an HTML table, you can extract rows, but they will not always be correct. For example, FIG. 3 shows an example annotated table, 300, in which a cell, 301, spans multiple rows. In HTML (not shown in FIG. 3), a table corresponding to table 300 can typically be represented by including the cell inside the first row (e.g., corresponding to row 302) that it spans, and annotating the cell as spanning two rows. This means that the first row (e.g., corresponding to row 302) of the corresponding HTML table has three elements (e.g., corresponding to cells 301, 304 and 305), and the second row (e.g., corresponding to row 303) has only two elements (e.g., corresponding to cells 306 and 307). In the HTML representation, although a cell (e.g., corresponding to cell 301), could be the header for the second row(e.g., corresponding to row 303), it does not even appear within that row. Moreover, finding the appropriate column headers for elements in the second row in the HTML representation can be particularly challenging, because counting alone will not be enough: you may need to adjust for any spanning issues.

In comparison, table 300 of FIG. 3 includes the column and row identifier annotations using the index term approach discussed above in relation to stage 108. In the index term approach, each cell can contain an annotation with respect to both the row and column to which the cell belongs. The content of a cell can be linked to its headers by finding matching index values. For example, assuming that cell 301 is a header cell, cell 307 would adopt cell 301 as a row header because they both have a row index of 2. Cells in the same row share the same row identifiers, so cell 307 becomes a member of rows 1 and 2. Similarly, cells in the same column can have the same column identifiers, so any cell can be associated with other cells in that column (including the header cells for the column). For example, cell 307 shares the same column as cell 305 via having a column index of 3.

Figure 4:
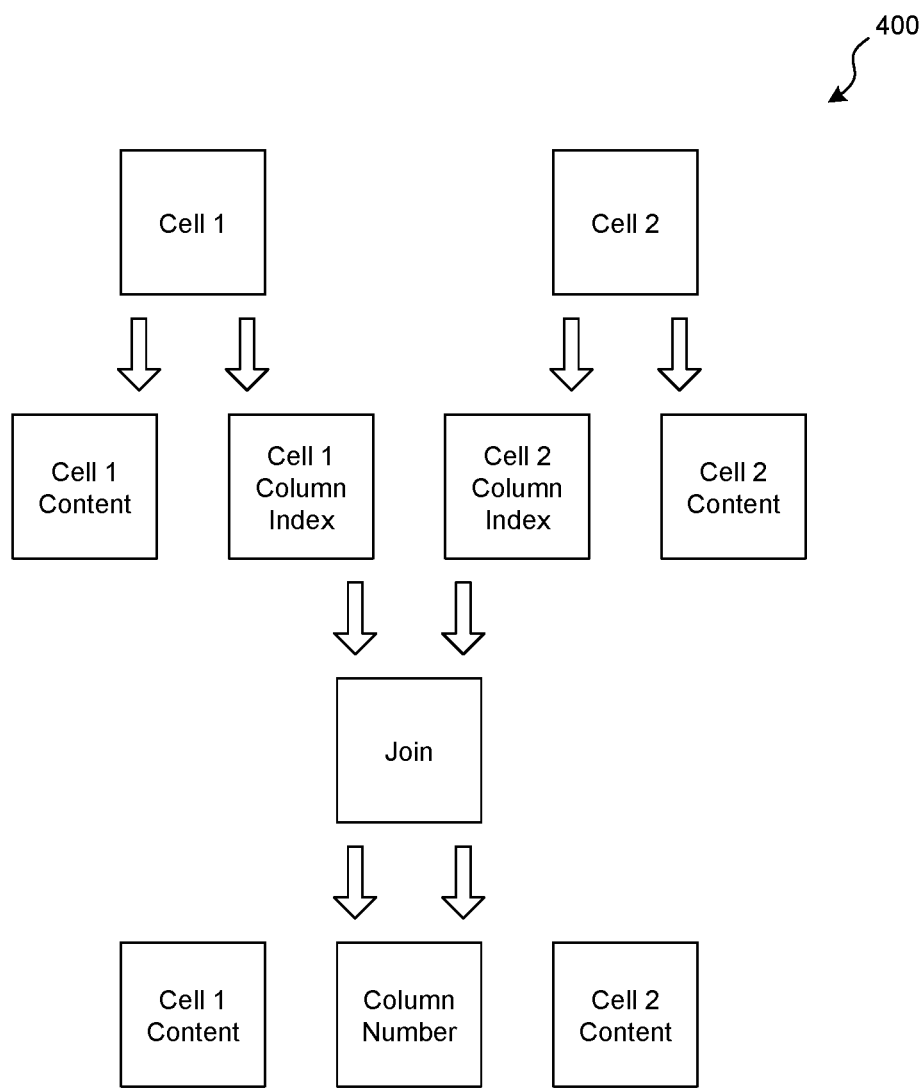
FIG. 4 is a flow diagram illustrating a process used in some implementations for associating cells in the same column via a shared index term column identifier.

FIG. 4 shows a process 400 used in some implementations in which associating cells in the same column via a shared index term column identifier can be achieved using a join operator, where the column indexes of pairs of cells are joined. This leaves only pairs of cells with the same column index (i.e., cells in the same column). Process 100 can restrict one of the cells in each pair to be a column header cell and the other to be a data cell, for example, by looking at the annotations. This process can find all pairs of cells such that one is a data cell, the other is a column header cell and they belong to the same column. Searching for cells in the same row is a similar process, with row indexes used instead of column indexes, and restricting one of the cells to be a row header instead of a column header.

In some implementations in which the row and column headers are directly copied into each cell, the extraction stage 116 can output the column header for the cell (readily available in the annotations) along with the cell contents (also readily available in the representation for the cell).

To extract particular relationships, constraints can be imposed on the content of the headers and the cell. This can be based on the type of the content, such as number, date, company, chemical description or disease. It can be based on a particular kind of disease such as "neoplasm" using an ontology, or a particular range (e.g., 1 to 100). It can also be based on pattern matching of the content using regular expressions or linguistic patterns.

FIG. 1B is a flow diagram illustrating a process 120 used in some implementations for extracting table information from unstructured text, for example, where the tables are initially in plain text. An example of such a document includes some types of electronic health records. In this case, an additional initial stage 102 can be performed to convert the unstructured text to a semi-structured representation similar to the one used as input for process 100. Process 120 can then continue from stage 102 to stages 106-116, discussed above in relation to process 100. Illustratively, FIG. 8A presents a table 800 represented in plain text, where the vertical alignment of the text is the only indication of the table's structure. FIG. 8B shows the same table converted to HTML format 810. This is a possible output of process 102 (FIG. 1B).

Stage 102 can include identifying one or more tables in unstructured text (e.g., which lines of text contain tables) and establishing the table structure (e.g., determining row and column boundaries).

Process 120 can identify the tables by performing one or more of: identifying lines within the text; identifying multiple rows where text or white space is aligned; identifying table captions or headers; or any combination thereof.

Once identified, process 120 can establish table structures by one or more of the following: establishing the column boundaries based on the alignment of white space across rows; recognizing the columns that a header spans based on the alignment of the header with respect to the columns below; establishing cell contents according to alignment of contents and white space; or any combination thereof.

FIG. 1C is a flow diagram illustrating a process 130 used in some implementations for extracting table information from unstructured text, as in process 120. Process 130 uses a single stage for identifying the tables and for establishing the table structure, and can then continue from stage 109 to stages 110-116, discussed above in relation to process 100.

Stage 107 can include identifying one or more tables in unstructured text (e.g. which lines of text contain tables) and establishing some of the table structure (e.g. determining row and column boundaries).

Process 130 can identify the tables by performing one or more of: identifying lines within the text; identifying multiple rows in which text or white space is aligned; identifying table captions or headers; or any combination thereof.

Stage 109 can establish table structures by one or more of the following: establishing the number of columns based on the differences in the amount of white space between one column of text and the next; recognizing the columns that a header spans based on the alignment of the header vs. columns below; establishing cell contents according to alignment of contents and white space; or any combination thereof. Each cell can be classified as either a header cell or a data cell. Header cells are recognized based on one or more of the following: explicit coding of header cells in the input; formatting differences between header cells and other cells; the presence of at least one header cell for every column. Header cells can be further classified as being a column header cell, a row header cell or possibly both, based on their position in the table.

Each cell can be linked to its respective column and row headers. A cell can be linked to multiple column or row headers, for example, when the table has individual headers for each column, and then other headers spanning multiple columns. In some implementations, column and row headers can be encoded directly by annotating each cell with the text of the column header cells in its column and the text of the row header cells in its row. In some implementations, the relation between a cell and its respective row headers and column headers can be encoded indirectly. Each cell can be annotated with one or more identifiers for the rows that it spans and one or more identifiers for the columns that it spans.

These annotations, represented in FIGS. 1A-1D as Annotated representation of tables 112, can use any unique identifier, for instance, numeric identifiers (indexes) that reflect the position of that row or column within the table. These embodiments allow identification of any two cells in the same row or column, even if neither is a header cell. In some implementations, at least some of the column and row headers can be encoded directly and at least some can be encoded indirectly.

In some implementations, cells that span multiple rows or columns may be expanded out. In some implementations, cells that span multiple rows or columns may have multiple headers, and headers that span multiple rows or columns are shared by multiple cells. In some implementations, cells including header cells that span multiple rows or columns may have multiple indexes corresponding to the individual rows and columns they span.

FIG. 1D is a flow diagram illustrating a process 140 used in some implementations for extracting table information using OCR to create semi-structured text. This could involve documents in PDF format (image or text). In this case, an additional initial stage 104 can be performed to run an OCR process on input document 101, thereby creating a semi-structured representation similar to the one used as input for stage 106 in FIG. 1A. In some implementations, the OCR process may create an unstructured document that can be provided to stage 102 in FIG. 1B or stage 107 in FIG. 1C.

Figure 5A:

FIG. 5A shows an example of a table 500 in a patent PDF document. Table 510 in FIG. 5B shows a stylesheet rendering of an XML version of the same table. This XML might be derived from conversion of the PDF document, or, in some embodiments, the patent authority may provide an XML version of the patent document. FIG. 5C shows a stylesheet rendering of XML (e.g., table 520) after the XML version of table 500 is processed in accordance with some embodiments of the presently disclosed technology. As illustrated in FIG. 5C, the cells containing the text "ARC1172 (SEQ ID NO 222)" have been merged, and this entire piece of text is the row header for the values 17 and 3 in the data cells in the same row.

FIG. 5D shows embodiments of the presently disclosed technology where annotations to tables or table cells are made available for inspection in tooltips (or other layers or portion of display). These tooltips pop up when a user hovers their mouse cursor over a table cell. FIG. 5D shows a tooltip 532 for one of the table cells, displaying the annotated identifiers for the row and column that the cell occupies, and also another tooltip 534 for the entire table, showing a unique identifier for the table.

FIG. 6 shows an example 600 of data extracted from table 520 in FIG. 5C. Illustratively, the example extraction can be performed in response to searches, queries, or other informational requests for the half-life values (T½) of the aptamers. The data extracted can be shown in HTML but can also be extracted into other formats such as Excel, XML, JSON, TSV and CSV.

FIG. 7 provides evidence for the extracted information in example 600. In accordance with some embodiments, a user can be referred directly to the correct position of a table (e.g., table 700) with highlighting to show the different pieces of data that have been extracted.

Those skilled in the art will appreciate that the components illustrated in each of the flow diagrams discussed above may be altered in a variety of ways. For example, the order of the logic may be rearranged, sub-steps may be performed in parallel, illustrated logic may be omitted, other logic may be included, etc.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives) and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, the word "or" refers to any possible permutation of a set of items. For example, the phrase "A, B, or C" refers to at least one of A, B, C, or any combination thereof, such as any of the following: A; B; C; A and B; A and C; B and C; A, B, and C; or multiples of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of extracting information from heterogeneous tables in semi-structured text and unstructured text, the method comprising steps of:
    identifying, by a computing device, target content from a table in an electronic document, wherein the target content is presented in a plurality of cells;
    classifying, by the computing device, the plurality of cells into one or more of header cells and a plurality of data cells based on at least one of explicit coding of the plurality of cells, formatting of the plurality of cells, relationship between the one or more header cells and columns in the table, presence of horizontal lines in the table, type of the target content in the plurality of cells, presence of measurement units within brackets in the table, and presence of words referring to mathematical operations on values in a table;
    annotating, automatically by the computing device, the plurality of data cell to indicate their positions in the table and an association between each of the plurality of data cells and the one or more header cells to enable extraction of the target content from the table; and
    indexing, by the computing device, the electronic document utilizing the association between the plurality of data cells and the one or more header cells for responding to search queries.

2. The method of claim 1, wherein the target content corresponds to semi-structured text that does not explicitly provide relationships between the plurality of cells and the one or more headers cells.

3. The method of claim 2, wherein the electronic document is selected from one of HTML and XML documents and includes format tags.

4. The method of claim 1, wherein the target content corresponds to plain text and the step of identifying the target content identifies at least one of lines within text, multiple rows where text or white space is aligned, and table captions or headers.

5. The method of claim 4, further comprising a step of converting the target content into semi-structured text.

6. The method of claim 5, wherein the step of converting comprises steps of
    establishing a number of columns based on differences in an amount of white space between two columns of text; and
    recognizing columns that the table captions or header spans, or establishing cell contents according to alignment of contents and white space.

7. The method of claim 1, further comprising a step of classifying the one or more of header cells into one or more column header cells and one or more row header cells based at least partially on a position of the one or more header cells in the table.

8. The method of claim 7, wherein the step of annotating associates each of the plurality of data cell with the one or more column header cells or the one or more row header cells.

9. A non-transitory computer-readable medium storing computer-executable instructions that, when executed by one or more processors, cause the one or more processors to perform a method of extracting information from heterogeneous tables in semi-structured text and unstructured text, the method comprising steps of:
    identifying, by a computing device, target content from a table in an electronic document, wherein the target content is presented in a plurality of cells;
    classifying, by the computing device, the plurality of cells into one or more of header cells and a plurality of data cells;
    annotating, automatically by the computing device, the plurality of data cell to indicate their positions in the table, and an association between each of the plurality of data cells and the one or more header cells to enable extraction of the target content from the table; and
    extracting, by the computing device, the target content from the table utilizing the association between plurality of data cells and one or more header cells for the target content extraction requests.

10. The non-transitory computer-readable medium of claim 9, wherein the electronic document is selected from one of HTML and XML documents and includes at least one of semi-structured text and unstructured text.

11. The non-transitory computer-readable medium of claim 9, wherein the step of classifying is based on at least one of explicit coding of the plurality of cells, formatting of the plurality of cells, relationship between the one or more header cells and columns in the table, presence of horizontal lines in the table, type of the target content in the plurality of cells, presence of measurement units within brackets the table, and presence of words referring to mathematical operations on values in a table.

12. The non-transitory computer-readable medium of claim 9, wherein the step of annotating indicates at least one of target content and position of the header cells.

13. The non-transitory computer-readable medium of claim 9, wherein the step of annotating indicates target content of the one or more header cells and a position of the one or more header cells.

14. The non-transitory computer-readable medium of claim 9, further comprising a step of generating a representation of the table utilizing the indications of the one or more header cells.

15. The non-transitory computer-readable medium of claim 9, further comprising a step of identifying one or more of the plurality of cells that span multiple columns or rows.

16. The non-transitory computer-readable medium of claim 15, further comprising a step of expanding the identified one or more cells.

17. A system of extracting information from heterogeneous tables in semi-structured text and unstructured text, the system comprising:
one or more processors configured to:
identify, target content from a table in an electronic document, wherein the target content is presented in a plurality of cells;
classify the plurality of cells into one or more row- or column-defining cells and a plurality of data cells;
automatically annotate the plurality of data cell to indicate their positions in the table and an association between each of the plurality of data cells and the one or more row- or column-defining cells to enable extraction of the target content from the table; and
generate a representation of a table based at least partially on the association of each of the plurality of data cells with one or more row- or column-defining defining cells.

18. The system of claim 17, wherein the one or more processors are further configured to classify the one or more row- or column-defining cells into a subset of column header cells and a subset of row header cells based at least partially on a position of the one or more row- or column-defining cells in the table.

19. The system of claim 18, wherein at least one of the one or more row- or column-defining cell is classified as both a column header cell and a row header cell.

20. The system of claim 18, wherein the one or more processors are further configured to merge two or more of the plurality of data cells.

21. The system of claim 20, wherein the two or more cells are merged based on at least one of the plurality of data cells within a proximity or an alignment of text being empty.

* * * * *